Oct. 24, 1933.

W. LOTTRITZ 1,931,735

SHOCK ABSORBER

Filed April 18, 1928

INVENTOR
WILLIAM LOTTRITZ
BY
Munn & Co.
ATTORNEYS.

UNITED STATES PATENT OFFICE 1,931,735

SHOCK ABSORBER

William Lottritz, San Francisco, Calif.

Application April 18, 1928. Serial No. 270,934

2 Claims. (Cl. 267—8)

My invention relates to improvements in shock absorbers, and it consists in the combinations, constructions and arrangements hereinafter described and claimed.

It is well known that the wheels of a vehicle are caused to move in a vertical direction by the uneven surface over which the vehicle travels. Springs that are interposed between the frame of the car and the axles have a tendency to suddenly return the wheels to their normal positions after the springs have been flexed.

I therefore propose to provide a shock absorber of novel construction that will retard the movement of the springs when they return to their normal position. The mechanism for accomplishing this consists chiefly of an arm moved by the flexing spring, and a piston so connected to the arm as to be moved longitudinally in a cylinder when the arm is swung. The piston moves against a fluid body that is caused to bleed slowly past the piston when the piston moves in one direction and to flow quickly past the piston when it moves in the opposite direction. The slow movement of the piston is used for retarding the movement of the spring back to its normal position.

An object of my invention is to provide a shock absorber that employs novel means for converting a swinging motion of the arm into a longitudinal motion of the piston.

A further object of my invention is to provide a device of the type described which is simple in construction yet durable and efficient for the purpose intended.

A further object of my invention is to provide a shock absorber in which the piston is free from openings for receiving shafts or guide rods thus preventing leakage past the piston except as its periphery.

Other objects and their advantages will appear in the following specification, and the novel features of my invention will be particularly pointed out in the claims hereto attached.

Figure 1:
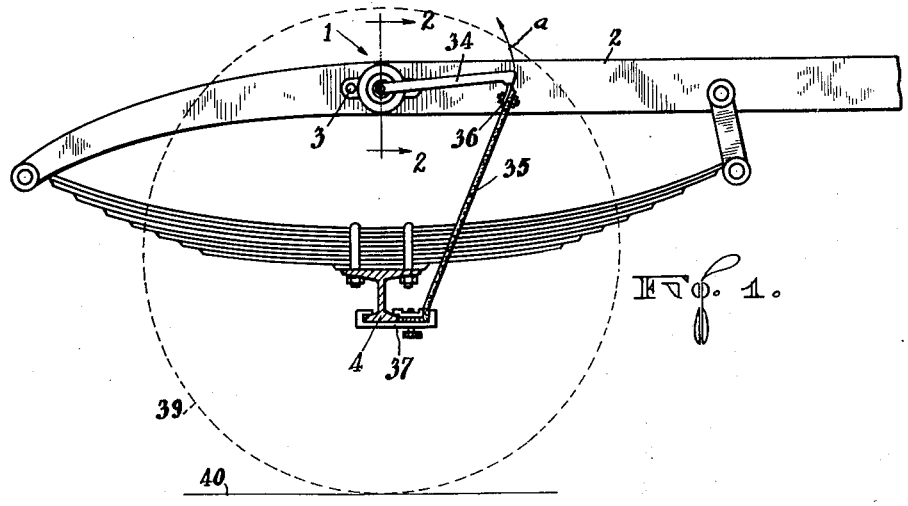
Figure 2:
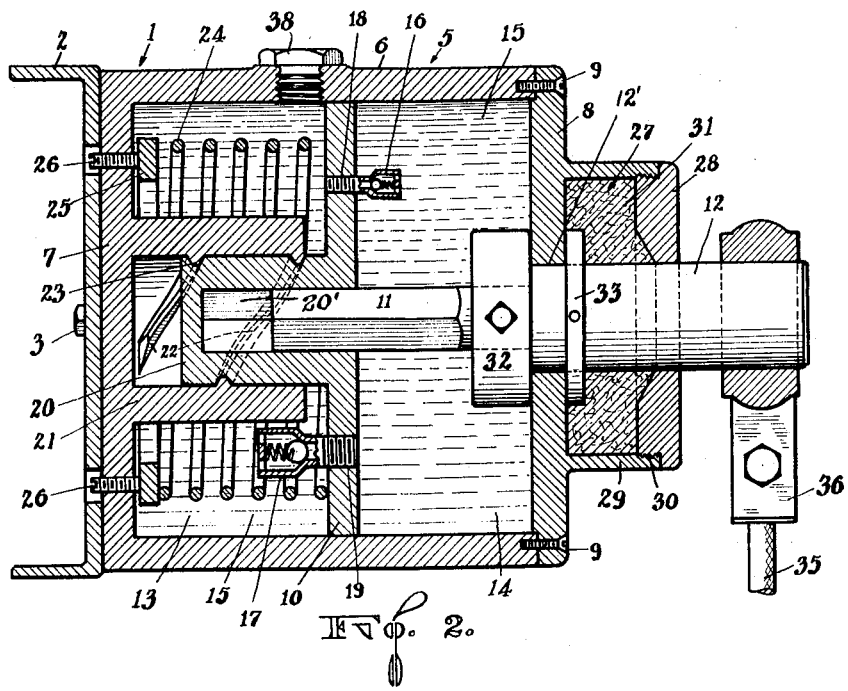

My invention is illustrated in the accompanying drawing forming a part of this application, in which Figure 1 is a fragmentary side elevation of an automobile chassis showing my device operatively connected thereto;

Figure 2 is a transverse vertical section taken on line 2—2 of Figure 1.

In carrying out my invention, I have provided a shock absorber unit 1 that is secured to the chassis 2 by the bolts 3, and operatively connected to the car axle 4 by a flexible cord 35.

Referring now to Figure 2, it will be noted that the housing 5 of the shock absorber unit comprises a cylindrical portion 6 that has base 7 formed integral therewith at one end of the cylinder, The opposite end of the cylinder is provided with a removable cover plate 8 that is secured to the portion 6 by the cap-screws 9. It is thus apparent that access to the mechanism that is enclosed within the housing may be readily gained by removing the plate 8.

A piston 10 is snugly fitted into the cylinder and is supported upon a square portion 11 of the shaft 12. The piston thus divides the cylinder into two compartments 13 and 14, both of which are filled with a fluid 15. These two compartments are interconnected by valves 16 and 17 that are threaded into the apertures 18 and 19 respectively. The purpose of these valves will be readily understood as the specification proceeds.

The piston 10 has a central boss 20 extending therefrom which is received in a sleeve 21 which extends from the base 7. A series of threads 22 are received in corresponding grooves 23 in the boss 20. The boss 20 has a non-circular recess or well 20' for slidably receiving the non-circular portion 11 of the shaft 12. Any rotary motion that may be imparted to the shaft 12 will thus cause the piston to move in a longitudinal direction, and the piston is permitted to do so sliding on the square portion 11 of the shaft 12.

Concentric with and encircling the sleeve 21, I have placed a helical coil-spring 24. One end of the spring bears against the piston 10 and the other end against an adjustable ring 25. The tension of the spring may be varied by adjusting the set-screws 26 which extend through the base 7. The spring is under compression when the piston is in its normal position, which is approximately midway of the cylinder. The spring tends to urge the piston away from the base 7.

In order that pressure exerted upon the fluid may not force the fluid from the cylinder, I have provided a packing gland 27 at the outer end of the cylinder. It is composed of a cap 28 that is threaded into the member 29 as at 30. Packing 31 is disposed within the gland, and thus a sealing effect is obtained.

Longitudinal movement of the shaft 12 is prevented by set collars 32 and 33 that are placed on the opposite sides of the plate 8. The shaft, however, is free to rotate in its bearing 12' that is formed in the cover plate.

An arm 34 is secured to the outer end of the shaft 12 and is connected to the flexible cord cord 35 by a leaf spring 36. The lower end of the cord 35 is fixed to the axle 4 by a clamp arrangement 37.

The cylinder may be readily and conveniently filled by removing the filling plug 38, and pouring the fluid through the opening that is thus provided.

While I have shown only the preferred form of my invention, I wish it to be understood that various changes or modifications may be made within the scope of the claims without departing from the spirit of the invention.

From the foregoing description of the various parts of the device, the operation thereof may be readily understood. Let us assume that the wheel 39 strikes an uneven surface on the ground 40. The wheel will then be suddenly forced upward and will carry the axle 4 toward the frame 2. As previously mentioned, the spring 24 tends to force the piston away from the base 7, and it is permitted to do so whenever the arm 34 is free to rotate in the direction of the arrow a. As the piston 10 rotates it must also advance toward the cover plate 8 due to the threads 22. This longitudinal movement causes the fluid 15 to quickly flow from the compartment 14 and into the adjacent compartment 13 by way of valve 17.

The return movement of the wheel now takes place. As the axle 4 moves away from the chassis 2, tension is immediately placed upon the flexible cord 35. This action causes the arm 34 to rotate in a clockwise direction as viewed in Figure 1. It is now apparent that the shaft 12 must also rotate, and further that the piston will move toward the base 7. The fluid is now forced slowly through the valve 16 and back into the compartment 14.

It will thus be seen that the initial flexing of the vehicle spring is not in any way affected by the shock absorber, but the return movement is affected, causing the spring to return to its normal position slowly.

It will be noted that all of the end thrust is directed at the threads 22 and 23 and at no other part of the device. The shaft 12 exerts no end thrust on the plate 8 because it is slidably received in the non-circular bore 20'.

In order to prevent leakage of the oil past the piston, the piston must be free from shafts, screws, or rods passing entirely therethrough. As soon as any of these elements pass through openings in the piston, oil leakage will occur no matter how tight the fit. This is due to the fact that the piston moves only a slight distance and the oil is under tremendous pressure. The piston 10 has only openings for the check valves and therefore no leakage can take place. The check valves control the passage of oil. The periphery of the piston can be accurately ground so as to contact with the cylinder wall and prevent oil leakage.

I claim:

1. A checking device comprising a cylindrical casing, a shaft rockably carried thereby and having a non-circular portion, a piston slidable in the cylinder and having a non-circular bore therein closed at one end by an integral portion of the piston, said bore receiving the shaft, a cylindrical member carried by the casing and having internal threads, a cylindrical portion carried by the piston and having external threads for meshing with the first named threads, whereby a rotation of the shaft will move the piston longitudinally, a liquid disposed in the casing, and means for by-passing the liquid past the piston.

2. A movement checking device comprising a cylinder having a fluid disposed therein, a shaft rotatably mounted in said cylinder and having one end projecting therefrom, a piston rotated by the shaft and being slidable therealong and dividing the cylinder into two compartments, the periphery of the piston being smooth and continuous and making a fluid-tight contact with the cylinder wall, co-operative means carried by the cylinder and the piston for causing the piston to move longitudinally when rotated by the shaft, said means taking up all of the thrust of the moving parts said piston having means for by-passing the liquid past the piston.

WILLIAM LOTTRITZ.